Figure 1:
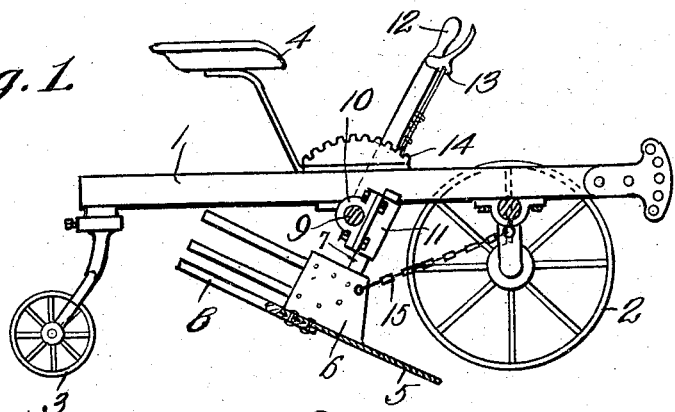

H. J. AUSTIN.
POTATO DIGGING ATTACHMENT.
APPLICATION FILED AUG. 9, 1918.

1,295,671.

Patented Feb. 25, 1919.

Witnesses
James F. Crown
Van Buren

Inventor
Hiram J. Austin,
By
Richard B. Owen,
Attorney

UNITED STATES PATENT OFFICE.

HIRAM J. AUSTIN, OF WELLSBORO, PENNSYLVANIA.

POTATO-DIGGING ATTACHMENT.

1,295,671.   Specification of Letters Patent.   Patented Feb. 25, 1919.

Application filed August 9, 1918. Serial No. 249,128.

*To all whom it may concern:*

Be it known that I, HIRAM J. AUSTIN, a citizen of the United States, residing at Wellsboro, in the county of Tioga and State of Pennsylvania, have invented certain new and useful Improvements in Potato-Digging Attachments, of which the following is a specification.

The invention is primarily designed to provide means of the nature of an attachment to be applied to a cultivator, plow, or like implement to facilitate the harvesting of potatoes and like crop which are harvested by being dug.

The attachment comprises a shovel and a screen or like means for removing the earth from the potatoes, after the same have been lifted, the shovel being provided with standards whereby it is adapted to be attached to the cultivator or like implement by means of which it is drawn over the field when in operation.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Figure 2:
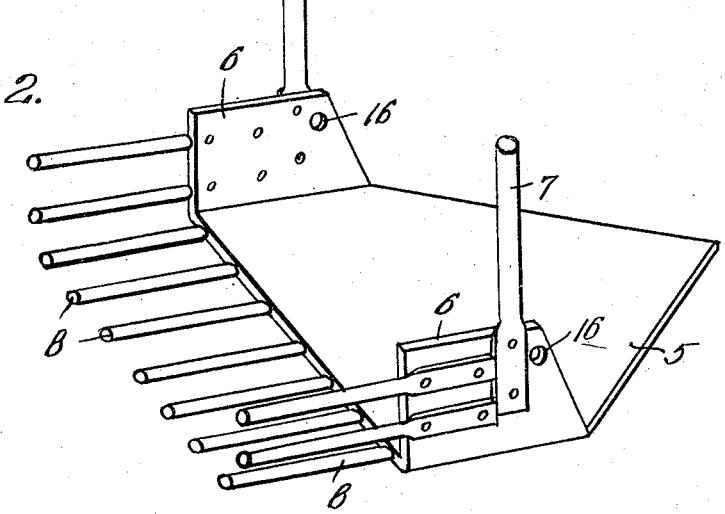

In the drawing:

Figure 1 is a longitudinal section of a riding cultivator or like implement provided with a potato digger attachment embodying the invention, and Fig. 2 is a perspective view of the attachment.

Corresponding and like parts are referred to in the following description and indicated in both views of the drawing by like reference characters.

The implement illustrated is shown simply to designate the application of the attachment when applied to a cultivator, plow, or like device for supporting the digger when moved over the field in the operation of lifting or digging potatoes. The implement shown comprises a main frame 1 and supporting wheels 2 and 3, the latter having a caster effect. The implement is provided with a driver's seat 4.

The attachment or digger comprises a shovel 5, the same having its forward end pointed so as to readily penetrate the ground and lift the potatoes. Wings 6 are disposed at the sides of the shovel 5 and extend upwardly and are provided with standards 7 by means of which the digger is attached to the cultivator, plow or like wheeled device. A plurality of fingers 8 extend rearwardly from the shovel and the wings 6, and these fingers are closely related and constitute in effect a screen whereby earth is separated from the potatoes, the earth falling back upon the ground whereas the potatoes slide upwardly over the fingers 8 and are received in a receptacle or elevator (not shown).

It is also observed that the fingers 8 may act to agitate and loosen and detach the earth from the potatoes thereby admitting the latter to fall upon the surface of the ground to be subsequently gathered in any way.

Any means may be provided for attaching the digger to the implement and also for adjusting the digger. As shown the implement is provided with a transverse rod 9 upon which a sleeve 10 is mounted, said sleeve being provided with clamps 11 which receive the standards 7. An operating lever 12 is connected with the sleeve 10 and is provided with the usual hand latch 13 which coöperates with a toothed segment 14 so as to hold the digger in the required adjusted position. A chain 15 or analogous connection is interposed between the digger and the forward part of the implement so as to sustain the strain. The lower rear ends of the connection 15 are attached to the upper forward corners of the wings 6 as indicated at 16. After the digger has been adjusted by manipulating the lever 12 the connection 15 is adjusted so as to sustain the strain. In this connection it is observed that the implement may be provided with means for receiving links of the chain 15 so that the effective length of the connection may be varied according to the adjustment of the digger.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In an implement of the character specified, a main frame, a transverse rod on the frame, a sleeve mounted loosely on the transverse rod, coöperating means carried by the sleeve and frame for adjusting the sleeve and holding it in the required adjusted position, a clamp on the sleeve, a shovel adjustably held to the sleeve by the clamp and a connection adjustably connecting the shovel with the frame.

In testimony whereof I affix my signature in presence of two witnesses.

HIRAM J. AUSTIN.

Witnesses:
B. G. AUSTIN,
C. J. AUSTIN.

Copies of this patent may be obtained for five cents each, by addressing the "Commissioner of Patents, Washington, D. C."